(12) United States Patent
DeVaul et al.

(10) Patent No.: US 8,718,477 B2
(45) Date of Patent: May 6, 2014

(54) BALLOON NETWORK WITH FREE-SPACE OPTICAL COMMUNICATION BETWEEN SUPER-NODE BALLOONS AND RF COMMUNICATION BETWEEN SUPER-NODE AND SUB-NODE BALLOONS

(75) Inventors: Richard Wayne DeVaul, Mountain View, CA (US); Eric Teller, San Francisco, CA (US); Clifford L. Biffle, Berkeley, CA (US); Josh Weaver, San Jose, CA (US)

(73) Assignee: Google Inc., Mountain View, CA (US)

( * ) Notice: Subject to any disclaimer, the term of this patent is extended or adjusted under 35 U.S.C. 154(b) by 163 days.

(21) Appl. No.: 13/346,636

(22) Filed: Jan. 9, 2012

(65) Prior Publication Data

US 2013/0177321 A1    Jul. 11, 2013

(51) Int. Cl.
*H04B 10/00* (2013.01)
(52) U.S. Cl.
USPC ........... 398/115; 398/118; 398/124; 398/125; 398/128
(58) Field of Classification Search
USPC .................................................. 398/115–131
See application file for complete search history.

(56) References Cited

U.S. PATENT DOCUMENTS

| | | | |
|---|---|---|---|
| 2,790,479 A | | 4/1957 | Mastenbrook |
| 3,452,949 A | | 7/1969 | Maloney et al. |
| 4,366,936 A | | 1/1983 | Ferguson |
| 5,186,414 A | * | 2/1993 | Holzschuh et al. .......... 244/3.12 |
| 5,949,766 A | * | 9/1999 | Ibanez-Meier et al. ....... 370/316 |
| 6,010,093 A | * | 1/2000 | Paulson .......................... 244/24 |
| 6,151,308 A | * | 11/2000 | Ibanez-Meier et al. ....... 370/316 |
| 6,324,398 B1 | * | 11/2001 | Lanzerotti et al. ............ 455/431 |
| 6,628,941 B2 | * | 9/2003 | Knoblach et al. ............. 455/431 |
| 6,830,222 B1 | | 12/2004 | Nock et al. |
| 6,857,601 B2 | * | 2/2005 | Akahori .......................... 244/96 |
| 7,046,934 B2 | * | 5/2006 | Badesha et al. ............... 398/121 |
| 7,341,223 B2 | * | 3/2008 | Chu .............................. 244/24 |
| 7,356,390 B2 | * | 4/2008 | Knoblach et al. .................. 701/4 |
| 7,567,779 B2 | * | 7/2009 | Seligsohn et al. ............ 455/12.1 |
| 7,603,137 B1 | * | 10/2009 | Elliott ......................... 455/552.1 |
| 7,725,126 B2 | * | 5/2010 | Elliott ......................... 455/552.1 |

(Continued)

OTHER PUBLICATIONS

Joachim Horwath et al., Broadband Backhaul Communication for Stratospheric Platforms: The Stratospheric Optical Payload Experiment (STROPEX), Society of Photo-Optical Instrumentation Engineers (SPIE), 2006, vol. 6304.

(Continued)

*Primary Examiner* — Agustin Bello
(74) *Attorney, Agent, or Firm* — McDonnell Boehnen Hulbert & Berghoff LLP

(57) ABSTRACT

Exemplary embodiments may involve hierarchical balloon networks that include both optical and radio frequency links between balloons. An exemplary network system may include: (a) a plurality of super-node balloons, where each super-node balloon comprises a free-space optical communication system for data communications with one or more other super-node balloons and (b) a plurality of sub-node balloons, where each of the sub-node balloons comprises a radio-frequency communication system that is operable for data communications. Further, at least one super-node balloon may further include an RF communication system that is operable to transmit data to at least one sub-node balloon, where the RF communication system of the at least one sub-node balloon is further operable to receive the data transmitted by the at least one super-node balloon and to transmit the received data to at least one ground-based station.

33 Claims, 9 Drawing Sheets

(56) References Cited

U.S. PATENT DOCUMENTS

| | | | |
|---|---|---|---|
| 7,844,218 B2* | 11/2010 | Seligsohn et al. | 455/11.1 |
| 7,913,948 B2 | 3/2011 | Porter | |
| 7,948,426 B2 | 5/2011 | Pevler et al. | |
| 8,061,648 B2 | 11/2011 | Lachenmeier | |
| 2002/0072361 A1* | 6/2002 | Knoblach et al. | 455/431 |
| 2002/0167702 A1* | 11/2002 | Badesha et al. | 359/172 |
| 2004/0065773 A1 | 4/2004 | Morales | |
| 2005/0173591 A1* | 8/2005 | Colting | 244/26 |
| 2006/0000945 A1 | 1/2006 | Voss | |
| 2006/0003698 A1* | 1/2006 | Seligsohn et al. | 455/12.1 |
| 2010/0039984 A1* | 2/2010 | Brownrigg | 370/316 |
| 2010/0214974 A1* | 8/2010 | Elliott | 370/316 |
| 2012/0232721 A1* | 9/2012 | Engblom | 701/3 |
| 2013/0101291 A1* | 4/2013 | Wittenschlaeger | 398/58 |
| 2013/0177321 A1* | 7/2013 | DeVaul et al. | 398/115 |
| 2013/0177322 A1* | 7/2013 | DeVaul et al. | 398/131 |

OTHER PUBLICATIONS

Dirk Giggenbach et al., Optical Free-Space Communications Downlinks from Stratospheric Platforms—Overview on STROPEX, the Optical Communications Experiment of CAPANINA, 14th IST Mobile & Wireless Communications Summit, Jun. 2005, No. 483, Dresden, Germany.

Anthony S. Acampora et al., A Broadband Wireless Access Network Based on Mesh-Connected Free-Space Optical Links, IEEE Personal Communications, Oct. 1999, 1070-9916/99, 62-65.

J. Thornton et al., Broadband communications from a high-altitude platform: the European HeliNet programme, Electronics & Communication Engineering Journal, Jun. 2001, 138-144.

Jayasri Akella et al., Building Blocks for Mobile Free-Space-Optical Networks, IEEE, 2005, 0/7803-9019-9/05.

D. Grace et al., CAPANINA—Communications from Aerial Platform Networks Delivering Broadband Information for All, 14th IST Mobile & Wireless Communications Summit, Jun. 2005, No. 252, Dresden, Germany.

Mihael Mohorcic et al., Evaluation of Wavelength Requirements for Stratospheric Optical Transport Networks, Journal of Communications, Sep. 2009, vol. 4, No. 8, 588-596.

Carolina Fortuna et al., HAP based optical transport network design, Proceedings of the 15th International Electrotechnical and Computer Science Conference (ERK) Sep. 2006.

Alejandro Aragon-Zavala et al., High-Altitude Platforms for Wireless Communications, John Wiley & Sons, Ltd., 2008, pp. C1-80.

Alejandro Aragon-Zavala et al., High-Altitude Platforms for Wireless Communications, John Wiley & Sons, Ltd., 2008, pp. 81-158.

Alejandro Aragon-Zavala et al., High-Altitude Platforms for Wireless Communications, John Wiley & Sons, Ltd., 2008, pp. 159-241.

A. Biswas et al., Deep Space Optical Communications Link Availability and Data Volume, Free-Space Laser Communication Technologies XVI, San Jose, CA, Jan. 2004.

D. Giggenbach et al., Optical Data Downlinks from Earth Observation Platforms, Proceedings of the SPIE, 2009, vol. 7199.

David Grace et al., Integrating Users into the Wider Broadband Network via High Altitude Platforms, IEEE Wireless Communications, 1536-1286/05, Oct. 2005.

Jayasri Akella et al., Multi-channel Communication in Free-Space Optical Networks for the Last-mile, available online at: http://networks.ecse.rpi.edu/~sri/papers/Array-lanman07.pdf (last visited Jan. 18, 2012).

Alan E. Willner et al., Physical Layer Routing in Free-Space Optical Networks, LEOS, available online at: http://photonicssociety.org/newsletters/oct05/physical_layer.html (last visited Jan. 18, 2012).

Justin Mullins, NASA Develops 'Smart' Weather Balloons for Launch Sites, NewScientist, May 23, 2007.

James Hutchinson, Mobile Mesh Network Finds Interest in NGOs, available online at: http://www.computerworld.com.au/article/374682/mobile_mesh_network_finds_interest_ngos/ (last visited Jan. 17, 2012).

Dung Dinh Luong, et al., Network Architecture and Protocols, CAPANINA, Oct. 16, 2006, pp. 1-83.

Dung Dinh Luong, et al., Network Architecture and Protocols, CAPANINA, Oct. 16, 2006, pp. 84-172.

In Keun Son, Design and Optimization of Free Space Optical Networks, Auburn University, Dec. 13, 2010, pp. 1-78, Auburn, Alabama.

In Keun Son, Design and Optimization of Free Space Optical Networks, Auburn University, Dec. 13, 2010, pp. 79-147, Auburn, Alabama.

Hui Zang, et al., A Review of Routing and Wavelength Assignment Approaches for Wavelength-Routed Optical WDM Networks, Optical Networks Magazine, Jan. 2000, pp. 47-60.

Scott Bloom, et al., The Last-Mile Solution: Hybrid FSO Radio, AirFiber, Inc., May 2002, pp. 1-20.

Mohammed N. Smadi, et al., Free-Space Optical Gateway Placement in Hybrid Wireless Mesh Networks, Journal of Lightwave Technology, Jul. 15, 2009, vol. 27, No. 14, pp. 2688-2697.

Roy Eddleston, et al., Mesh Networking Soars to New Heights, available online at: http://www.airballooningevent.com/mesh-networking-soars-to-new-heights (last visited Jan. 18, 2012).

Barry William Walsh, Balloon Network Test Successful, available online at: http://17.taylor.edu/community/news/news_detail.shtml?inode=14221 (last visited Jan. 18, 2012).

T.C. Tozer et al., High-altitude platforms for wireless communications, Electronics & Communication Engineering Journal, Jun. 2001, 127-137.

G. Ellinas, et al., Network Control and Management Challenges in Opaque Networks Utilizing Transparent Optical Switches, available online at: http://www.jaywalkertc.com/publications/JAW_live_papers/IEEE_Opt_Comm.pdf (last visited Jan. 18, 2012).

Asuman E. Ozdaglar, et al., Routing and Wavelength Assignment in Optical Networks, available online at: http://web.mit.edu/asuman/www/documents/RWA_Paper.pdf (last visited Jan. 18, 2012).

David Grace et al., Broadband Communications via High Altitude Platforms, John Wiley & Sons, Ltd., 2011, pp. 49-73.

David Grace et al., Broadband Communications via High Altitude Platforms, John Wiley & Sons, Ltd., 2011, pp. 75-113.

David Grace et al., Broadband Communications via High Altitude Platforms, John Wiley & Sons, Ltd., 2011, pp. 219-238.

Balaram et al., Autonomous Mobility, Navigation and Control for Venus Aerobots, International Symposium on Artificial Intelligence, Optics and Automation in Space, Jul. 14, 1997, Tokyo, Japan.

Andrew S. Carten Jr., An Investigation of the Applicability of High Altitude, Lighter-Than-Air (LTA) Vehicles to the Tactical Communications Relay Problem, Air Force Cambridge Research Labs, Hanscom Air Force Base, Aug. 20, 1974, Massachusetts.

Michael Corbett et al., High Altitude Balloon Project, Wright State University, Engineering Design, Mar. 11, 2006, Dayton, Ohio.

* cited by examiner

BALLOON NETWORK WITH FREE-SPACE OPTICAL COMMUNICATION BETWEEN SUPER-NODE BALLOONS AND RF COMMUNICATION BETWEEN SUPER-NODE AND SUB-NODE BALLOONS

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

In one aspect, an exemplary network system may include: (a) a plurality of super-node balloons configured as super-nodes in a balloon network, wherein each super-node balloon comprises a free-space optical communication system that is operable for data communications with one or more other super-node balloons; and (b) a plurality of sub-node balloons configured as sub-nodes in the balloon network, wherein each of the sub-node balloons comprises a radio-frequency (RF) communication system that is operable for data communications; wherein at least one super-node balloon further comprises an RF communication system that is operable to transmit data to at least one sub-node balloon, wherein the RF communication system of the at least one sub-node balloon is operable to receive the data transmitted by the at least one super-node balloon and to transmit the received data to at least one ground-based station.

In another aspect, an exemplary network system may include a plurality of balloons that collectively operate as a hierarchical balloon network, wherein the plurality of balloons comprise at least (a) a plurality of first balloons and (b) a plurality of second balloons; wherein each of the first balloons comprises a free-space optical communication system that is operable for packet-data communication with one or more other first balloons; wherein each of the second balloons comprises a radio-frequency (RF) communication system that is operable for data communications; and wherein at least one first balloon further comprises an RF communication system that is operable to transmit data to at least one second balloon, wherein the RF communication system of the at least one second balloon is operable to receive the data transmitted by the at least one first balloon and to transmit the received data to at least one ground-based station.

These as well as other aspects, advantages, and alternatives, will become apparent to those of ordinary skill in the art by reading the following detailed description, with reference where appropriate to the accompanying drawings.

DETAILED DESCRIPTION

Figure 1:
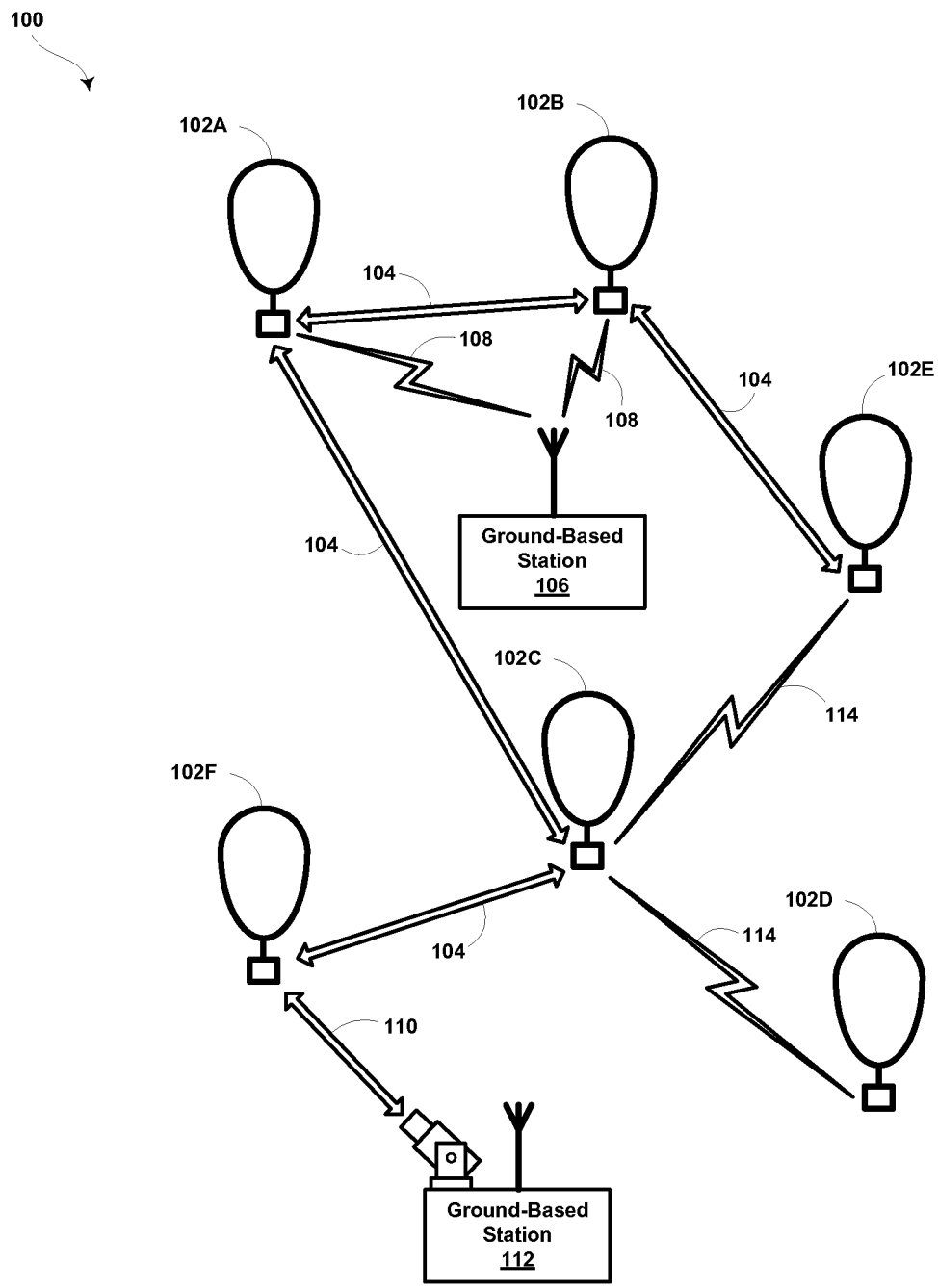
FIG. 1 is a simplified block diagram illustrating a balloon network, according to an exemplary embodiment.

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

I. Overview

Exemplary embodiments help to provide a data network that includes a plurality of balloons; for example, a mesh network formed by high-altitude balloons deployed in the stratosphere. Since winds in the stratosphere may affect the locations of the balloons in a differential manner, each balloon in an exemplary network may be configured to change its horizontal position by adjusting its vertical position (i.e., altitude). For example, by adjusting its altitude, a balloon may be able find winds that will carry it horizontally (e.g., latitudinally and/or longitudinally) to a desired horizontal location.

Further, in an exemplary balloon network, the balloons may communicate with one another using free-space optical communications. For instance, the balloons may be configured for optical communications using ultra-bright LEDs (which are also referred to as "high-power" or "high-output" LEDs). In some instances, lasers could be used instead of or in addition to LEDs, although regulations for laser communications may restrict laser usage. In addition, the balloons may communicate with ground-based station(s) using radio-frequency (RF) communications.

In some embodiments, a high-altitude-balloon network may be homogenous. That is, the balloons in a high-altitude-balloon network could be substantially similar to each other in one or more ways. More specifically, in a homogenous high-altitude-balloon network, each balloon is configured to communicate with one or more other balloons via free-space optical links. Further, some or all of the balloons in such a network may additionally be configured to communicate with ground-based station(s) using RF communications. Thus, in some embodiments, the balloons may be homogenous in so far as each balloon is configured for free-space optical communication with other balloons, but heterogeneous with regard to RF communications with ground-based stations.

In other embodiments, a high-altitude-balloon network may be heterogeneous, and thus may include two or more different types of balloons (i.e., two or more types of balloons that function in substantially different ways). For example, some balloons in a heterogeneous network may be configured as super-nodes, while other balloons may be configured as sub-nodes. It is also possible that some balloons in a heterogeneous network may be configured to function as both a super-node and a sub-node. Such balloons may function as either a super-node or a sub-node at a particular time, or, alternatively, act as both simultaneously depending on the context. For instance, an example balloon could aggregate search requests of a first type to transmit to a ground-based station. The example balloon could also send search requests of a second type to another balloon, which could act as a super-node in that context. Further, some balloons, which may be super-nodes in an exemplary embodiment, can be configured to communicate via optical links with ground-based stations and/or satellites.

In an exemplary configuration, the super-node balloons may be configured to communicate with nearby super-node balloons via free-space optical links. However, the sub-node balloons may not be configured for free-space optical communication, and may instead be configured for some other type of communication, such as RF communications. In that case, a super-node may be further configured to communicate with sub-nodes using RF communications. Thus, the sub-nodes may relay communications between the super-nodes and one or more ground-based stations using RF communications. In this way, the super-nodes may collectively function as backhaul for the balloon network, while the sub-nodes function to relay communications from the super-nodes to ground-based stations.

II. Exemplary Balloon Networks

FIG. 1 is a simplified block diagram illustrating a balloon network 100, according to an exemplary embodiment. As shown, balloon network 100 includes balloons 102A to 102F, which are configured to communicate with one another via free-space optical links 104. Configured as such, balloons 102A to 102F may collectively function as a mesh network for packet-data communications. Further, at least some of balloons 102A and 102B may be configured for RF communications with ground-based stations 106 via respective RF links 108. Yet further, some balloons, such as balloon 102F, may be configured to communicate via optical link 110 with ground-based station 112.

In an exemplary embodiment, balloons 102A to 102F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an exemplary embodiment, high-altitude balloons may be generally configured to operate in an altitude range within the stratosphere that has relatively low wind-speeds (e.g., between 5 and 20 miles per hour (mph)).

More specifically, in a high-altitude-balloon network, balloons 102A to 102F may generally be configured to operate at altitudes between 18 km and 25 km (although other altitudes are possible). This altitude range may be advantageous for several reasons. In particular, this layer of the stratosphere generally has relatively low wind speeds (e.g., winds between 5 and 20 mph) and relatively little turbulence. Further, while the winds between 18 km and 25 km may vary with latitude and by season, the variations can be modeled in a reasonably accurate manner. Additionally, altitudes above 18 km are typically above the maximum flight level designated for commercial air traffic. Therefore, interference with commercial flights is not a concern when balloons are deployed between 18 km and 25 km.

To transmit data to another balloon, a given balloon 102A to 102F may be configured to transmit an optical signal via an optical link 104. In an exemplary embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical receivers. Additional details of exemplary balloons are discussed in greater detail below, with reference to FIG. 3.

In a further aspect, balloons 102A to 102F may utilize one or more of various different RF air-interface protocols for communication with ground-based stations 106 via respective RF links 108. For instance, some or all of balloons 102A to 102F may be configured to communicate with ground-based stations 106 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-ground RF communication, among other possibilities.

In a further aspect, there may scenarios where RF links 108 do not provide a desired link capacity for balloon-ground communications. For instance, increased capacity may be desirable to provide backhaul links from a ground-based gateway, and in other scenarios as well. Accordingly, an exemplary network may also include downlink balloons, which provide a high-capacity air-ground link.

For example, in balloon network 100, balloon 102F is configured as a downlink balloon. Like other balloons in an exemplary network, a downlink balloon 102F may be operable for optical communication with other balloons via optical links 104. However, a downlink balloon 102F may also be configured for free-space optical communication with a ground-based station 112 via an optical link 110. Optical link 110 may therefore serve as a high-capacity link (as compared to an RF link 108) between the balloon network 100 and a ground-based station 108.

Note that in some implementations, a downlink balloon 102F may additionally be operable for RF communication with ground-based stations 106. In other cases, a downlink balloon 102F may only use an optical link for balloon-to-ground communications. Further, while the arrangement shown in FIG. 1 includes just one downlink balloon 102F, an exemplary balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which may provide an RF link with substantially the same capacity as one of the optical links 104. Other forms are also possible.

Ground-based stations, such as ground-based stations 106 and/or 108, may take various forms. Generally, a ground-based station may include components such as transceivers, transmitters, and/or receivers for communication via RF links and/or optical links with a balloon network. Further, a ground-based station may use various air-interface protocols in order to communicate with a balloon 102A to 102F over an RF link. As such, a ground-based station 106 may be configured as an access point via which various devices can connect to balloon network 100. Ground-based stations 106 may have other configurations and/or serve other purposes without departing from the scope of the invention.

In a further aspect, some or all balloons 102A to 102F could be configured to establish a communication link with space-based satellites in addition to, or as an alternative to, a ground-based communication link. In some embodiments, a balloon may communicate with a satellite via an optical link. However, other types of satellite communications are also possible.

Further, some ground-based stations, such as ground-based station 108, may be configured as gateways between balloon network 100 and one or more other networks. Such a ground-based station 108 may thus serve as an interface between the balloon network and the Internet, a cellular service provider's network, and/or other types of networks. Variations on this configuration and other configurations of a ground-based station 108 are also possible.

A. Mesh-Network Functionality

As noted, balloons 102A to 102F may collectively function as a mesh network. More specifically, since balloons 102A to 102F may communicate with one another using free-space optical links, the balloons may collectively function as a free-space optical mesh network.

In a mesh-network configuration, each balloon 102A to 102F may function as a node of the mesh network, which is operable to receive data directed to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

To operate as a mesh network, balloons 102A to 102F may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102F move relative to one another and/or relative to the ground. Accordingly, an exemplary balloon network 100 may apply a mesh protocol to update the state of the network as the topology of the network changes. For example, to address the mobility of the balloons 102A to 102F, balloon network 100 may employ and/or adapt various techniques that are employed in mobile ad hoc networks (MANETs). Other examples are possible as well.

In some implementations, a balloon network 100 may be configured as a transparent mesh network. More specifically, in a transparent balloon network, the balloons may include components for physical switching that is entirely optical, without any electrical components involved in the physical routing of optical signals. Thus, in a transparent configuration with optical switching, signals travel through a multi-hop lightpath that is entirely optical.

In other implementations, the balloon network 100 may implement a free-space optical mesh network that is opaque. In an opaque configuration, some or all balloons 102A to 102F may implement optical-electrical-optical (OEO) switching. For example, some or all balloons may include optical cross-connects (OXCs) for OEO conversion of optical signals. Other opaque configurations are also possible.

In a further aspect, balloons in an exemplary balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, it may be necessary to assign the same wavelength for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath.

Further, various routing algorithms may be employed in an opaque configuration. For example, to determine a primary lightpath and/or one or more diverse backup lightpaths for a given connection, exemplary balloons may apply or consider shortest-path routing techniques such as Dijkstra's algorithm and k-shortest path, and/or edge and node-diverse or disjoint routing such as Suurballe's algorithm, among others. Additionally or alternatively, techniques for maintaining a particular quality of service (QoS) may be employed when determining a lightpath. Other techniques are also possible.

B. Station-Keeping Functionality

In an exemplary embodiment, a balloon network 100 may implement station-keeping functions to help provide a desired network topology. For example, station-keeping may involve each balloon 102A to 102F maintaining and/or moving into a certain position relative to one or more other balloons in the network (and possibly in a certain position relative to the ground). As part of this process, each balloon 102A to 102F may implement station-keeping functions to determine its desired positioning within the desired topology, and if necessary, to determine how to move to the desired position.

The desired topology may vary depending upon the particular implementation. In some cases, balloons may implement station-keeping to provide a substantially uniform topology. In such cases, a given balloon 102A to 102F may implement station-keeping functions to position itself at substantially the same distance (or within a certain range of distances) from adjacent balloons in the balloon network 100.

In other cases, a balloon network 100 may have a non-uniform topology. For instance, exemplary embodiments may involve topologies where balloons are distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

In a further aspect, the topology of an exemplary balloon network may be adaptable. In particular, station-keeping functionality of exemplary balloons may allow the balloons to adjust their respective positioning in accordance with a change in the desired topology of the network. For example, one or more balloons could move to new positions to increase or decrease the density of balloons in a given area. Other examples are possible.

In some embodiments, a balloon network 100 may employ an energy function to determine if and/or how balloons should move to provide a desired topology. In particular, the state of a given balloon and the states of some or all nearby balloons may be input to an energy function. The energy function may apply the current states of the given balloon and the nearby balloons to a desired network state (e.g., a state corresponding to the desired topology). A vector indicating a desired movement of the given balloon may then be determined by determining the gradient of the energy function. The given balloon may then determine appropriate actions to take in order to effectuate the desired movement. For example, a balloon may determine an altitude adjustment or adjustments such that winds will move the balloon in the desired manner.

C. Control of Balloons in a Balloon Network

Figure 2:
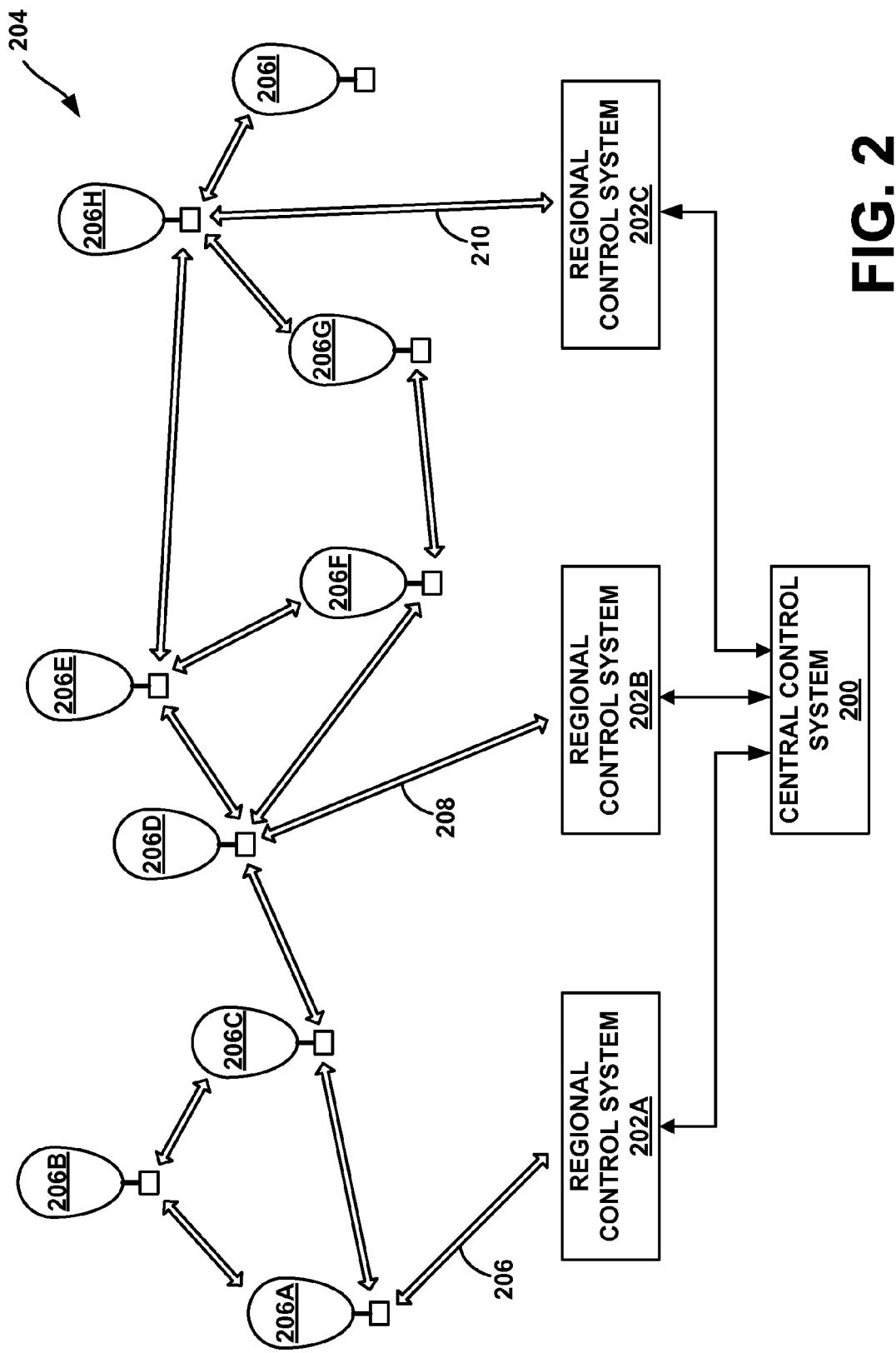
FIG. 2 is a block diagram illustrating a balloon-network control system, according to an exemplary embodiment.

In some embodiments, mesh networking and/or station-keeping functions may be centralized. For example, FIG. 2 is a block diagram illustrating a balloon-network control system, according to an exemplary embodiment. In particular, FIG. 2 shows a distributed control system, which includes a central control system 200 and a number of regional control-systems 202A to 202B. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via a number of regional control systems 202A to 202C. These regional control systems 202A to 202C may be configured to receive communications and/or aggregate data from balloons in the respective geographic areas that they cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 204A, 204D, and 204H are configured as downlink balloons. As such, regional control systems 202A to 202C may respectively communicate with balloons 204A, 204D, and 204H via optical links 206, 208, and 210, respectively.

In the illustrated configuration, only some of balloons 206A to 206I are configured as downlink balloons. The balloons 206A, 206F, and 206I that are configured as downlink balloons may relay communications from central control system 200 to other balloons in the balloon network, such as balloons 206B-E and 206G-H. However, it should be understood that it in some implementations, it is possible that all balloons may function as downlink balloons. Further, while FIG. 2 shows multiple balloons configured as downlink balloons, it is also possible for a balloon network to include only one downlink balloon, or possibly even no downlink balloons.

Note that a regional control system 202A to 202B may in fact just be a particular type of ground-based station that is configured to communicate with downlink balloons (e.g., such as ground-based station 112 of FIG. 1). Thus, while not shown in FIG. 2, a control system may be implemented in conjunction with other types of ground-based stations (e.g., access points, gateways, etc.).

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all of the balloons 206A to 206I in order to determine an overall state of the network.

The overall state of the network may then be used to coordinate and/or facilitate certain mesh-networking functions such as determining lightpaths for connections. For example, the central control system 200 may determine a current topology based on the aggregate state information from some or all of the balloons 206A to 206I. The topology may provide a picture of the current optical links that are available in balloon network and/or the wavelength availability on the links. This topology may then be sent to some or all of the balloons so that a routing technique may be employed to select appropriate lightpaths (and possibly backup lightpaths) for communications through the balloon network 204.

In a further aspect, the central control system 200 (and possibly regional control systems 202A to 202C as well) may also coordinate certain station-keeping functions for balloon network 204. For example, the central control system 200 may input state information that is received from balloons 206A to 206I to an energy function, which may effectively compare the current topology of the network to a desired topology, and provide a vector indicating a direction of movement (if any) for each balloon, such that the balloons can move towards the desired topology. Further, the central control system 200 may use altitudinal wind data to determine respective altitude adjustments that may be initiated to achieve the movement towards the desired topology. The central control system 200 may provide and/or support other station-keeping functions as well.

FIG. 2 shows a distributed arrangement that provides centralized control, with regional control systems 202A to 202C coordinating communications between a central control system 200 and a balloon network 204. Such an arrangement may be useful to provide centralized control for a balloon network that covers a large geographic area. In some embodiments, a distributed arrangement may even support a global balloon network that provides coverage everywhere on earth. Of course, a distributed-control arrangement may be useful in other scenarios as well.

Further, it should be understood that other control-system arrangements are also possible. For instance, some implementations may involve a centralized control system with additional layers (e.g., sub-region systems within the regional control systems, and so on). Alternatively, control functions may be provided by a single, centralized, control system, which communicates directly with one or more downlink balloons.

In some embodiments, control and coordination of a balloon network may be shared by a ground-based control system and a balloon network to varying degrees, depending upon the implementation. In fact, in some embodiments, there may be no ground-based control systems. In such an embodiment, all network control and coordination functions may be implemented by the balloon network itself. For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Further, in some aspects, control of a balloon network may be partially or entirely localized, such that it is not dependent on the overall state of the network. For example, individual balloons may implement station-keeping functions that only consider nearby balloons. In particular, each balloon may implement an energy function that takes into account its own state and the states of nearby balloons. The energy function may be used to maintain and/or move to a desired position with respect to the nearby balloons, without necessarily considering the desired topology of the network as a whole. However, when each balloon implements such an energy function for station-keeping, the balloon network as a whole may maintain and/or move towards the desired topology.

As an example, each balloon A may receive distance information $d_1$ to $d_k$ with respect to each of its k closest neighbors. Each balloon A may treat the distance to each of the k balloons as a virtual spring with vector representing a force direction from the first nearest neighbor balloon i toward balloon A and with force magnitude proportional to $d_i$. The balloon A may sum each of the k vectors and the summed vector is the vector of desired movement for balloon A. Balloon A may attempt to achieve the desired movement by controlling its altitude.

Alternatively, this process could assign the force magnitude of each of these virtual forces equal to $d_i \times d_i$, for instance. Other algorithms for assigning force magnitudes for respective balloons in a mesh network are possible.

In another embodiment, a similar process could be carried out for each of the k balloons and each balloon could transmit its planned movement vector to its local neighbors. Further rounds of refinement to each balloon's planned movement vector can be made based on the corresponding planned movement vectors of its neighbors. It will be evident to those skilled in the art that other algorithms could be implemented in a balloon network in an effort to maintain a set of balloon spacings and/or a specific network capacity level over a given geographic location.

D. Exemplary Balloon Configuration

Figure 3:
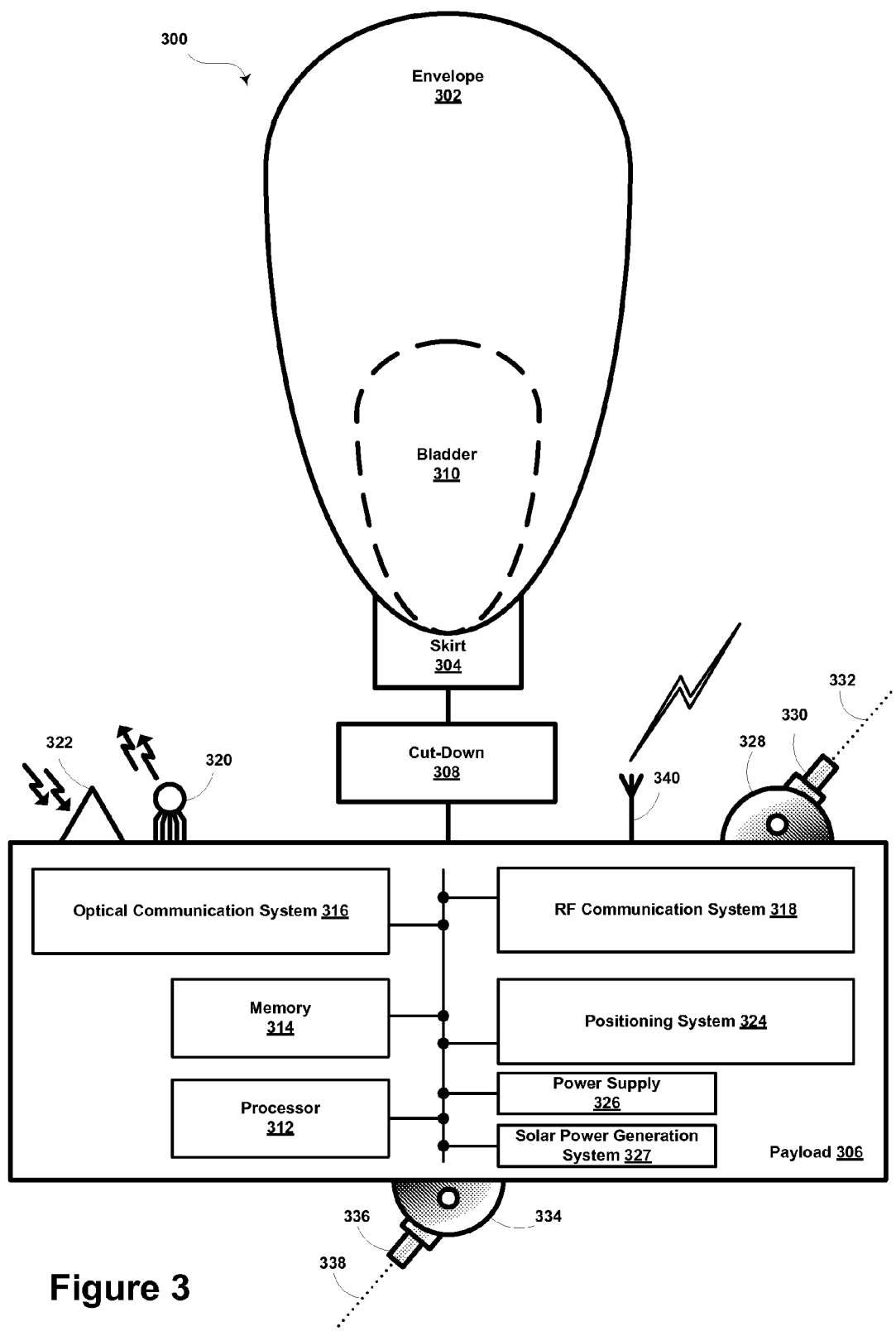
FIG. 3 shows a high-altitude balloon, according to an exemplary embodiment.

Various types of balloon systems may be incorporated in an exemplary balloon network. As noted above, an exemplary embodiment may utilize high-altitude balloons, which typically operate in an altitude range between 18 km and 22 km. FIG. 3 shows a high-altitude balloon 300, according to an exemplary embodiment. As shown, the balloon 300 includes an envelope 302, a skirt 304, a payload 306, and a cut-down system 308 that is attached between the balloon 302 and payload 304.

The envelope 302 and skirt 304 may take various forms, which may be currently well-known or yet to be developed. For instance, the envelope 302 and/or skirt 304 may be made of metalized Mylar or BoPet. Alternatively or additionally, some or all of the envelope 302 and/or skirt 304 may be constructed from a highly-flexible latex material or a rubber material such as chloroprene. Other materials are also possible. Further, the shape and size of the envelope 302 and skirt 304 may vary depending upon the particular implementation. Additionally, the envelope 302 may be filled with various different types of gases, such as helium and/or hydrogen. Other types of gases are possible as well.

The payload 306 of balloon 300 may include a processor 312 and on-board data storage, such as memory 314. The memory 314 may take the form of or include a non-transitory computer-readable medium. The non-transitory computer-readable medium may have instructions stored thereon, which can be accessed and executed by the processor 312 in order to carry out the balloon functions described herein.

The payload 306 of balloon 300 may also include various other types of equipment and systems to provide a number of different functions. For example, payload 306 may include optical communication system 316, which may transmit optical signals via an ultra-bright LED system 320, and which may receive optical signals via an optical-communication receiver (e.g., a photo-diode receiver system). Further, payload 306 may include an RF communication system 318, which may transmit and/or receive RF communications via an antenna system 324.

The payload 306 may also include a power supply 326 to supply power to the various components of balloon 300. The power supply 326 may include or take the form of a rechargeable battery. In other embodiments, the power supply 326 may additionally or alternatively represent other means known in the art for producing power. In addition, the balloon 300 may include a solar power generation system 327. The solar power generation system 327 may include solar panels and could be used to generate power that charges and/or is distributed by the power supply 326.

Further, payload 306 may include various types of other systems and sensors 328. For example, payload 306 may include one or more video and/or still cameras, a GPS system, various motion sensors (e.g., accelerometers, gyroscopes, and/or compasses), and/or various sensors for capturing environmental data. Further, some or all of the components within payload 306 may be implemented in a radiosonde, which may be operable to measure, e.g., pressure, altitude, geographical position (latitude and longitude), temperature, relative humidity, and/or wind speed and/or direction, among other information.

As noted, balloon 306 includes an ultra-bright LED system 320 for free-space optical communication with other balloons. As such, optical communication system 316 may be configured to transmit a free-space optical signal by modulating the ultra-bright LED system 320. The optical communication system 316 may be implemented with mechanical systems and/or with hardware, firmware, and/or software. Generally, the manner in which an optical communication system is implemented may vary, depending upon the particular application.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in envelope 302.

In an exemplary embodiment, a variable buoyancy system may include a bladder 310 that is located inside of envelope 302. The bladder 310 could be an elastic chamber configured to hold liquid and/or gas. Alternatively, the bladder 310 need not be inside the envelope 302. For instance, the bladder 310 could be a rigid bladder that could be pressurized well beyond neutral pressure. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow gas to escape from bladder 310. Multiple bladders 310 could be implemented within the scope of this disclosure. For instance, multiple bladders could be used to improve balloon stability.

In an example embodiment, the envelope 302 could be filled with helium, hydrogen or other lighter-than-air material. The envelope 302 could thus have an associated upward buoyancy force. In such an embodiment, air in the bladder 310 could be considered a ballast tank that may have an associated downward ballast force. In another example embodiment, the amount of air in the bladder 310 could be changed by pumping air (e.g., with an air compressor) into and out of the bladder 310. By adjusting the amount of air in the bladder 310, the ballast force may be controlled. In some embodiments, the ballast force may be used, in part, to counteract the buoyancy force and/or to provide altitude stability.

In other embodiments, the envelope 302 could be substantially rigid and include an enclosed volume. Air could be evacuated from envelope 302 while the enclosed volume is substantially maintained. In other words, at least a partial vacuum could be created and maintained within the enclosed volume. Thus, the envelope 302 and the enclosed volume could become lighter than air and provide a buoyancy force. In yet other embodiments, air or another material could be controllably introduced into the partial vacuum of the enclosed volume in an effort to adjust the overall buoyancy force and/or to provide altitude control.

In another embodiment, a portion of the envelope 302 could be a first color (e.g., black) and/or a first material from the rest of envelope 302, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 302 as well as the gas inside the envelope 302. In this way, the buoyancy force of the envelope 302 may increase. By rotating the balloon such that the second material is facing the sun, the temperature of gas inside the envelope 302 may decrease. Accordingly, the buoyancy force may decrease. In this manner, the buoyancy force of the balloon could be adjusted by changing the temperature/volume of gas inside the envelope 302 using solar energy. In such embodiments, it is possible that a bladder 310 may not be a necessary element of balloon 300. Thus, various contemplated embodiments, altitude control of balloon 300 could be achieved, at least in part, by adjusting the rotation of the balloon with respect to the sun.

Further, a balloon 306 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments the density of the balloon chamber in order to effectuate the determined altitudinal adjustments and cause the balloon to move laterally to the desired direction and/or to the desired location.

Alternatively, the altitudinal adjustments may be computed by a ground-based control system and communicated to the high-altitude balloon. As another alternative, the altitudinal adjustments may be computed by a ground-based or satellite-based control system and communicated to the high-altitude balloon. Furthermore, in some embodiments, specific balloons in a heterogeneous balloon network may be configured to compute altitudinal adjustments for other balloons and transmit the adjustment commands to those other balloons.

As shown, the balloon 300 also includes a cut-down system 308. The cut-down system 308 may be activated to separate the payload 306 from the rest of balloon 300. This functionality may be utilized anytime the payload needs to be accessed on the ground, such as when it is time to remove balloon 300 from a balloon network, when maintenance is due on systems within payload 306, and/or when power supply 326 needs to be recharged or replaced.

In an exemplary embodiment, the cut-down system 308 may include a connector, such as a balloon cord, connecting the payload 306 to the envelope 302 and a means for severing the connector (e.g., a shearing mechanism or an explosive bolt). In an example embodiment, the balloon cord, which may be nylon, is wrapped with a nichrome wire. A current could be passed through the nichrome wire to heat it and melt the cord, cutting the payload 306 away from the envelope 302. Other types of cut-down systems and/or variations on the illustrated cut-down system 308 are possible as well.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it theoretically does not need to be accessed on the ground. In yet other embodiments, balloons may be serviced in-flight by specific service balloons or another type of service aerostat or service aircraft.

III. Balloon Network With Optical And Rf Links Between Balloons

Figure 4:
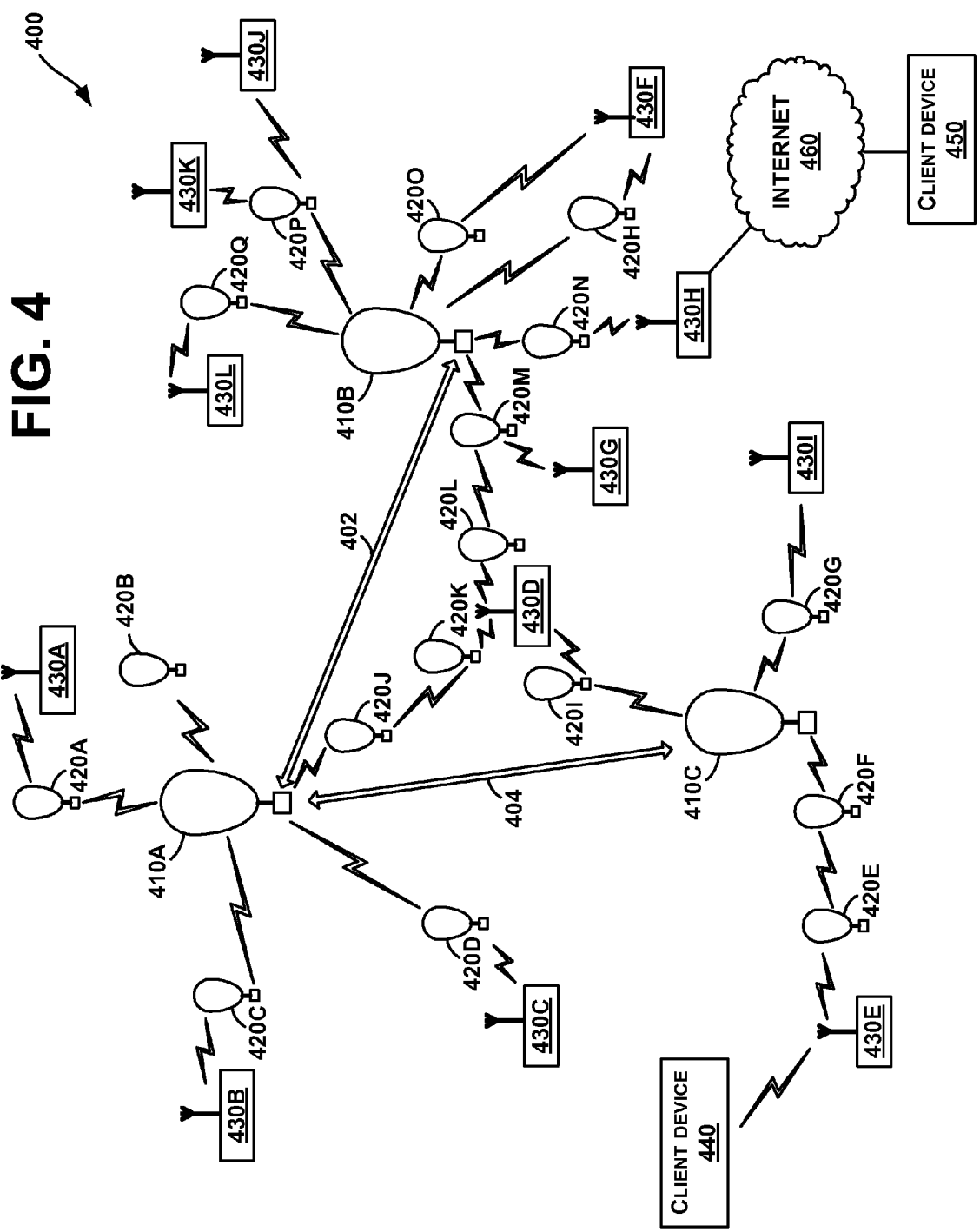
FIG. 4 is a simplified block diagram illustrating a balloon network that includes super-nodes and sub-nodes, according to an exemplary embodiment.

In some embodiments, a high-altitude-balloon network may include super-node balloons, which communicate with one another via optical links, as well as sub-node balloons, which communicate with super-node balloons via RF links. FIG. 4 is a simplified block diagram illustrating a balloon network that includes super-nodes and sub-nodes, according to an exemplary embodiment. More specifically, FIG. 4 illustrates a portion of a balloon network 400 that includes super-node balloons 410A to 410C (which may also be referred to as "super-nodes") and sub-node balloons 420A to 420Q (which may also be referred to as "sub-nodes").

Each super-node balloon 410A to 410C may include a free-space optical communication system that is operable for packet-data communication with other super-node balloons. As such, super-nodes may communicate with one another over optical links. For example, in the illustrated embodiment, super-node 410A and super-node 401B may communicate with one another over optical link 402, and super-node 410A and super-node 401C may communicate with one another over optical link 404.

Each of the sub-node balloons 420A to 420Q may include a radio-frequency (RF) communication system that is operable for packet-data communication over one or more RF air interfaces. Accordingly, some or all of the super-node balloons 410A to 410C may include an RF communication system that is operable to route packet data to one or more nearby sub-node balloons 420A to 420Q. When a sub-node 420A receives data from a super-node 410A via an RF link, the sub-node 420A may in turn use its RF communication system to transmit the received data to a ground-based station 430A to 430L via an RF link.

In some embodiments, all sub-node balloons may be configured to establish RF links with ground-based stations. For example, all sub-nodes may be configured similarly to sub-node 420A, which is operable to relay communications between super-node 410A and a ground-based station 430A via respective RF links.

In other embodiments, some or all sub-nodes may also be configured to establish RF links with other sub-nodes. For instance, in the illustrated embodiment, sub-node balloon 420F is operable to relay communications between super-node 410C and sub-node balloon 420E. In such an embodiment, two or more sub-nodes may provide a multi-hop path between a super-node balloon and a ground-based station, such as the multi-hop path provided between super-node 410C and a ground-based station 430E by sub-node balloons 420E and 420F.

Note that an RF link may be a directional link between a given entity and one or more other entities, or may be part of an omni-directional broadcast. In the case of an RF broadcast, it is possible that one or more "links" may be provided via a single broadcast. For example, super-node balloon 410A may establish a separate RF link with each of sub-node balloons 420A, 420B, and 420C. However, in other implementations, super-node balloon 410A may broadcast a single RF signal that can be received by sub-node balloons 420A, 420B, and 420C. In such an implementation, the single RF broadcast may effectively provide all of the RF links between super-node balloon 410A and sub-node balloons 420A, 420B, and 420C. Other examples are also possible.

Generally, the free-space optical links between super-node balloons have more bandwidth capacity than the RF links between super-node balloons and sub-node balloons. Further, free-space optical communication may be received at a much greater distance than RF communications. As such, the super-node balloons 410A to 410C may function as the backbone of the balloon network 400, while the sub-nodes 420A to 420Q may provide sub-networks providing access to the balloon network and/or connecting the balloon network to other networks.

As noted above, the super-nodes 410A to 410C may be configured for both longer-range optical communication with other super-nodes and shorter-range RF communications with nearby sub-nodes 420. For example, super-nodes 410A to 410C may use high-power or ultra-bright LEDs to transmit optical signals over optical links 402, 404, which may extend for as much as 100 miles, or possibly more. Configured as such, the super-nodes 410A to 410C may be capable of optical communications at data rates of 10 to 50 Gbit/sec.

A larger number of high-altitude balloons may then be configured as sub-nodes, which may communicate with ground-based Internet nodes at data rates on the order of approximately 10 Mbit/sec. For instance, in the illustrated implementation, the sub-nodes 420A to 420Q may be configured to connect the super-nodes 410A to 410C to other networks and/or directly to client devices. Note that the data rates and link distances described in the above example and elsewhere herein are provided for illustrative purposes and should not be considered limiting; other data rates and link distances are possible.

In a further aspect, some or all of the super-node balloons may be configured as downlink balloons. Additionally or alternatively, some or all of sub-nodes 420A to 420Q may be configured as downlink balloons. Further, it is possible that a hierarchical balloon network such as that shown in FIG. 4 may be implemented without any downlink balloons.

Further, in some embodiments, the super-node balloons, such as super-nodes 410A to 410C, may function as a core network (i.e., a backbone network), while the sub-node balloons 420A to 420Q may function as one or more access networks to the core network of super-nodes. In such an embodiment, some or all of the sub-nodes 420A to 420Q may also function as gateways to the balloon network 400. Note also that in some embodiments, some or all of the ground-based stations 430A to 430L may additionally or alternatively function as gateways to balloon network 400.

In another aspect, it should be understood that the network topology of the hierarchical balloon network shown in FIG. 4 is but one of many possible network topologies. Further, the network topology of an exemplary balloon network may vary dynamically as super-node and/or sub-node balloons move relative to the ground and/or relative to one another. Further, as with the balloon networks illustrated in FIGS. 1 and 2, a desired topology may be specified for a hierarchical balloon network may change dynamically over time as service needs and/or goals of the network change.

A. Station-Keeping in an Exemplary Hierarchical Balloon Network

In a further aspect, station-keeping functionality may be employed by an exemplary balloon network in order to achieve a topology that conforms with or that deviates by an acceptable amount from the desired topology. Thus, while station-keeping functionality may be implemented with the theoretical goal of achieving the desired topology, exemplary station-keeping functionality may also be implemented in accordance with flexible station-keeping parameters, rather than rigid rules as to the positioning of the balloons relative to the ground and/or relative to each other. For example, station-keeping parameters in a balloon network may include ranges of acceptable distances separating balloons and/or acceptable variation from desired (i.e., target) densities of balloons. Other station-keeping parameters are possible as well.

Allowing such deviation from the desired topology may be particularly useful when balloons rely solely on altitude control in order to control movement (e.g., by moving to an altitude where the wind carries the balloon towards a desired location). More specifically, in this flexible framework, the super-nodes and or sub-nodes may move relative to one another while staying substantially within the constraints of the desired topology. In particular, since exemplary high-altitude balloons may have no other means for horizontal movement other than winds carrying the balloons, the balloons may be in substantially continual movement. As such, the balloons may evaluate altitudinal wind data, as well as their own position and positions of nearby balloons. The balloons may then apply an energy function to this data to determine a direction of movement that is desired, and then adjust altitude (if necessary) to help achieve movement in the desired direction. Of course, other techniques for determining a desired direction are also possible.

In a further aspect, when a number of balloons are located in a certain area, and one or more of the balloons is substantially unused (or being used at a lower level than is desirable), the balloons in the area may coordinate to have one or more of the balloons depart from the area. In particular, the selected balloon or balloons may change altitude in order to reach a faster-moving layer of air than the other balloons in the area. A selected balloon may therefore move more quickly than the other balloons in the area, until it reaches another area in the balloon network. When a selected balloon reaches the other area, it may then adjust altitude so as to move into a layer of air having the same or similar wind speed as other balloons in the area that it has moved into. By undergoing this process, balloons may effectively move from one part of the network to another. As such, this process may be used to shift network resources, e.g., from areas where bandwidth is being under utilized to areas where more bandwidth is desirable.

Figure 5A:
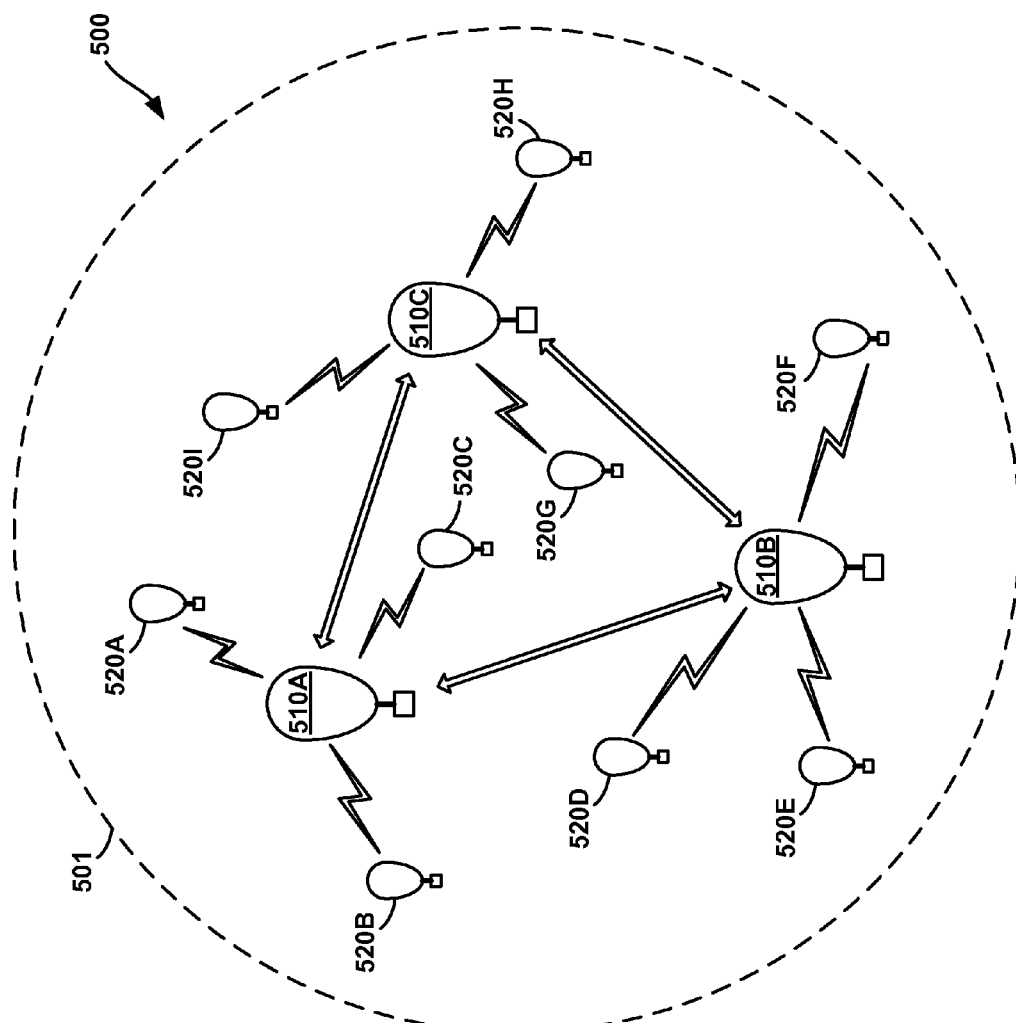
FIGS. 5A and 5B show an area covered by a portion of a balloon network, according to an exemplary embodiment.
Figure 5B:
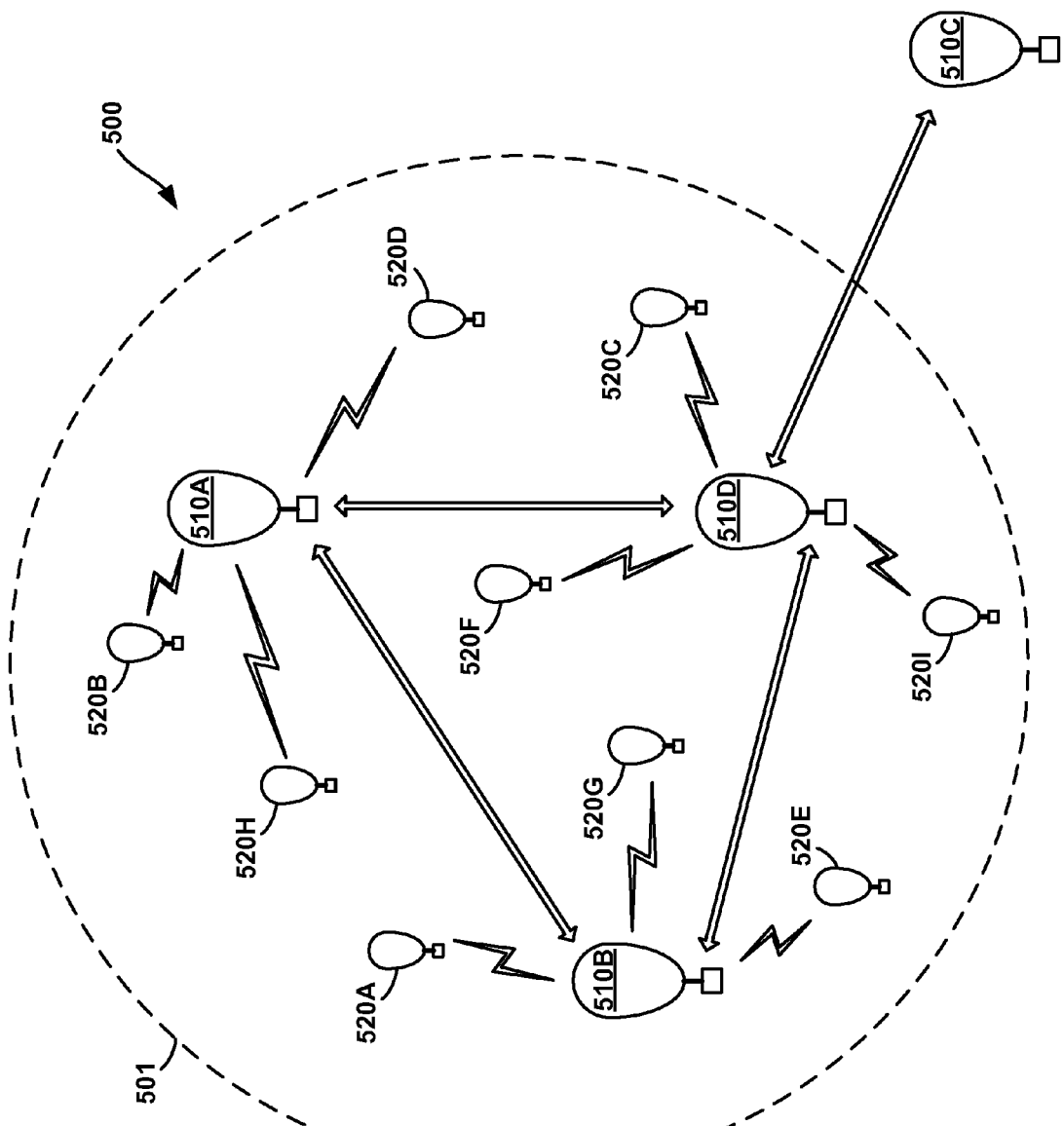

FIGS. 5A and 5B show an area 501 covered by a portion of a balloon network 500, according to an exemplary embodiment. In the state of balloon network 500 that is shown in FIG. 5A, the desired topology may specify that the balloon network 500 should preferably have a certain density (i.e., a certain number of super-nodes and/or a certain number of sub-nodes) and should preferably be distributed evenly (e.g., such that the balloons are equidistant from one another) within the area 502. In the framework of these station-keeping parameters, super-node balloons 510A to 510C and sub-node balloons 520A to 520I may be located over the geographic area 501, as shown in FIG. 5A.

However, since the balloons in balloon network 500 may be in substantially continual motion, it should be understood that FIG. 5A may represent a momentary state of the balloon network 500. Thus, the topology of the balloon network 500 may look very different at a later point in time, while still conforming with the same station-keeping parameters and the same desired topology. For example, in the state of balloon network 500 shown in FIG. 5B, the positions of the super-node balloons 510A to 510C and the sub-node balloons 520A to 520I have changed relative to the ground and relative to one another, as compared to the positions shown in FIG. 5A.

The change in network state shown between FIGS. 5A and 5B also illustrates how the balloon network may set-up and take down optical links and/or RF links as the balloons move within the framework defined by a set of station-keeping parameters. More specifically, in FIG. 5A, there is an optical link between super-node balloons 510A and 510B, between super-node balloons 510A and 510C, and between super-node balloons 510B and 510C. However, in FIG. 5B, super-node 510C has moved out of geographic area 501 such that it is no longer positioned within the acceptable distance range from super-nodes 510A and 510B. Further, another super-node balloon 510D has moved into geographic area 501, to a position that is within the acceptable distance range from super-nodes 510A and 510B. Accordingly, in the network state shown in FIG. 5B, the optical link between super-node balloons 510A and 510C and the optical link between super-node balloons 510B and 510C have been taken down. Further, in the state illustrated in FIG. 5B, super-node balloons 510C and 510D are within an acceptable distance from one another and as such, an optical link has been set up between super-node balloons 510C and 510D.

As further shown in FIG. 5B, the positioning of each sub-node balloon 520A to 520I has changed relative to super-node balloons 510A to 510C and the other sub-node balloons. More specifically, in the state shown in FIG. 5A, super-node balloon 510A has established RF links with sub-nodes 520A, 520B, and 520C, super-node balloon 510B has established RF links with sub-nodes 520D, 520E, and 520F, and super-node balloon 510C has established RF links with sub-nodes 520G, 520H, and 520I. However, in the network state shown in FIG. 5B, super-node balloon 510A has only maintained the RF link with sub-node 520B, and has established new RF links with sub-nodes 520D and 520H. Further, super-node balloon 510B has only maintained the RF link with sub-node 520E, and has established new RF links with sub-nodes 520A and 520G.

Yet further, super-node balloon 510C no longer has RF links with any of the sub-nodes 520A to 520I. Instead, super-node balloon 510D has established RF links with sub-nodes 520C, 520F, and 520I. Note, however, that super-node balloon 510C may have established a new RF link or links with other sub-nodes, which are not shown in FIG. 5B.

In a further aspect, FIGS. 5A and 5B also illustrate the fact that balloons may be interchangeable for purposes of station-keeping. More specifically, in FIG. 5B, super-node balloon 510C has moved such that the distance between super-node 510C and super-nodes 510A and 510B is beyond the upper extent of the acceptable distance range specified by current station-keeping parameters. However, exemplary station-keeping functionality may allow this to occur for various reasons. For example, station-keeping parameters may also specify a desired density of super-node balloons (e.g., the number of super-node balloons that is desirable in a certain area). In the illustrated example, a super-node density parameter may specify that three super-nodes should generally be located within area 501. Accordingly, if super-node 510D moves into area 501, another super-node (e.g., super-node 510C) may be allowed to move out of area 501. Other examples are also possible.

In a further aspect of some implementations, a desired topology for a hierarchical balloon network may be may be defined without differentiating between super-node balloons and sub-node balloons. In such an embodiment, station-keeping may be implemented in the same or in a similar manner by super-nodes 510A to 510D and sub-nodes 520A to 520I. For example, the desired topology may define a certain desired distance between adjacent balloons. As such, the desired distance between a super-node and another super-node may be the same as the desired distance between a super-node and a sub-node, and the same as the desired distance between two sub-nodes. Other examples of such a non-differentiated desired topology and/or of such uniform station-keeping are also possible.

When the desired topology does not differentiate between super-node balloons and sub-node balloons, the super-node balloons may additionally be configured to function as sub-nodes. In particular, the super-node balloons may be operable to establish and communicate via RF links with ground-based stations, as well as via optical links with other super-nodes and RF links with other sub-nodes. As such, the network coverage provided by a super-node and sub-node may be equivalent from the perspective of ground-based stations, which may be desirable when in a non-differentiated topology, where super-nodes and sub-nodes are essentially interchangeable within the topology. Note also that some or all super-nodes may be dually configured as sub-nodes in other embodiments, in which the desired topology may or may not be non-differentiated.

In some implementations, the spacing of adjacent super-nodes may differ from the desired spacing of adjacent sub-nodes and/or the desired spacing between a super-node and an adjacent sub-node. For example, consider an embodiment where the super-node balloons 510A to 510D function as the backbone network, and where the sub-node balloons function as one or more access networks. In such an embodiment, station-keeping parameters for the sub-nodes 520A to 520I may specify an acceptable distance range for adjacent sub-nodes. In an exemplary implementation, this distance range may be selected so as to help provide substantially continuous coverage in a given geographic area 501. However, distance ranges may be selected for other purposes as well.

Further, station-keeping parameters for super-node balloons, such as super-nodes 510A to 510D, may include a desired distance between adjacent super-nodes. When the super-nodes form a backbone network, the distance between adjacent super-nodes may be substantially greater than between super-nodes and adjacent sub-nodes and between adjacent sub-nodes. In practice, the acceptable distance range may extend to the range of the free-space optical communications systems employed by the super-nodes. In some cases, however, the acceptable distance range between super-nodes may be defined in view of other goals, such as increasing bandwidth in certain areas (e.g., by decreasing the upper extent of the acceptable distance range and thus increasing the density).

Yet further, the desired topology may include a separately defined desired distance between super-node balloons and adjacent sub-node balloons. As such, station-keeping parameters for super-nodes and/or for sub-nodes may include an acceptable distance range between super-nodes and adjacent sub-nodes.

When a hierarchical balloon network implements such station-keeping functionality, the super-nodes may move in an effort to position themselves within the defined distance range from adjacent super-nodes, while at the same time positioning themselves within the defined distance range from adjacent sub-nodes. Additionally, the sub-nodes may move in an effort to position themselves within the defined distance range from adjacent sub-nodes, and also within the defined distance range. In such an embodiment, the super-nodes implement station-keeping functionality to establish and/or maintain the positioning of the super-nodes relative to the sub-nodes (e.g., of keeping the distance between super-nodes and adjacent sub-nodes within the acceptable range).

In other embodiments, super-nodes and sub-nodes may share the responsibility of keeping the distances between super-nodes and adjacent sub-nodes within the acceptable range. Further, in yet other embodiments, the sub-nodes may implement station-keeping functionality to establish and/or maintain the positioning of the super-nodes relative to the sub-nodes. In either case, the sub-nodes may move in an effort to position themselves within the acceptable distance range to adjacent super-nodes, while at the same time positioning themselves within the acceptable distance range to adjacent sub-nodes.

B. Geographically-Defined Station-Keeping

As noted above, station-keeping parameters for an exemplary balloon network 500 may specify a general geographic area 501 in which certain acceptable distances and/or spacing between balloons should apply. Further, exemplary station-keeping parameters may be defined separately for each of a number of such areas. Each such area may therefore have different acceptable distances and/or spacing between balloons and/or may have other station-keeping parameters that differ. By varying such parameters from area to area, an exemplary network may provide a non-uniform topology, which may be desirable in a number of scenarios.

Figure 6A:
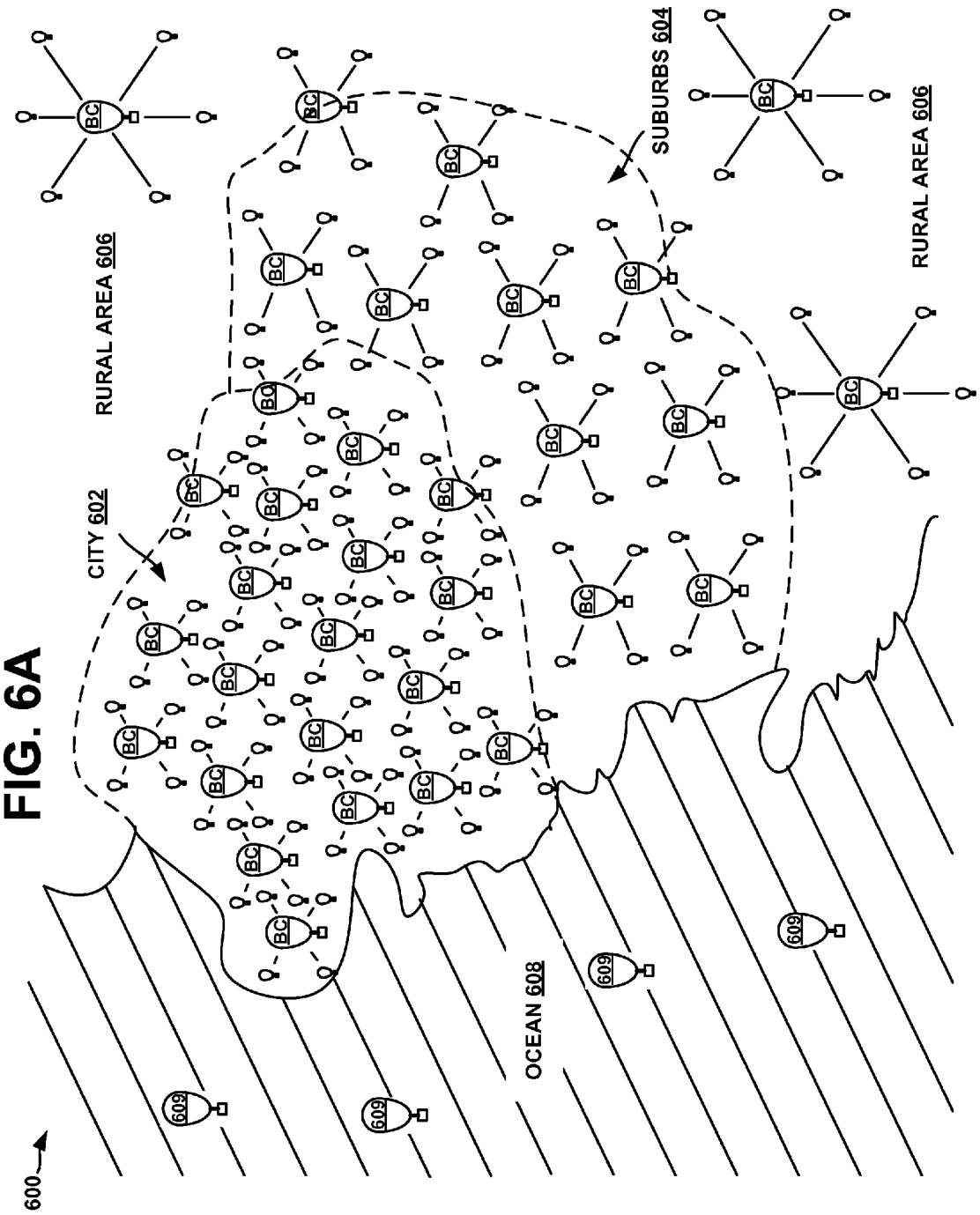
FIG. 6A shows coverage of an exemplary balloon network that spans a number of defined geographic areas, according to an exemplary embodiment.

For example, FIG. 6A shows coverage of an exemplary balloon network that spans a number of defined geographic areas, according to an exemplary embodiment. In particular, FIG. 6A shows high-altitude balloons located over a region 600 that includes a city 602, suburbs 604, a rural area 606, and an ocean 608. As such, station-keeping parameters for super-node balloons and/or sub-node balloons may vary between the city 602, the suburbs 604, the rural area 606, and the ocean 608.

Figure 6B:
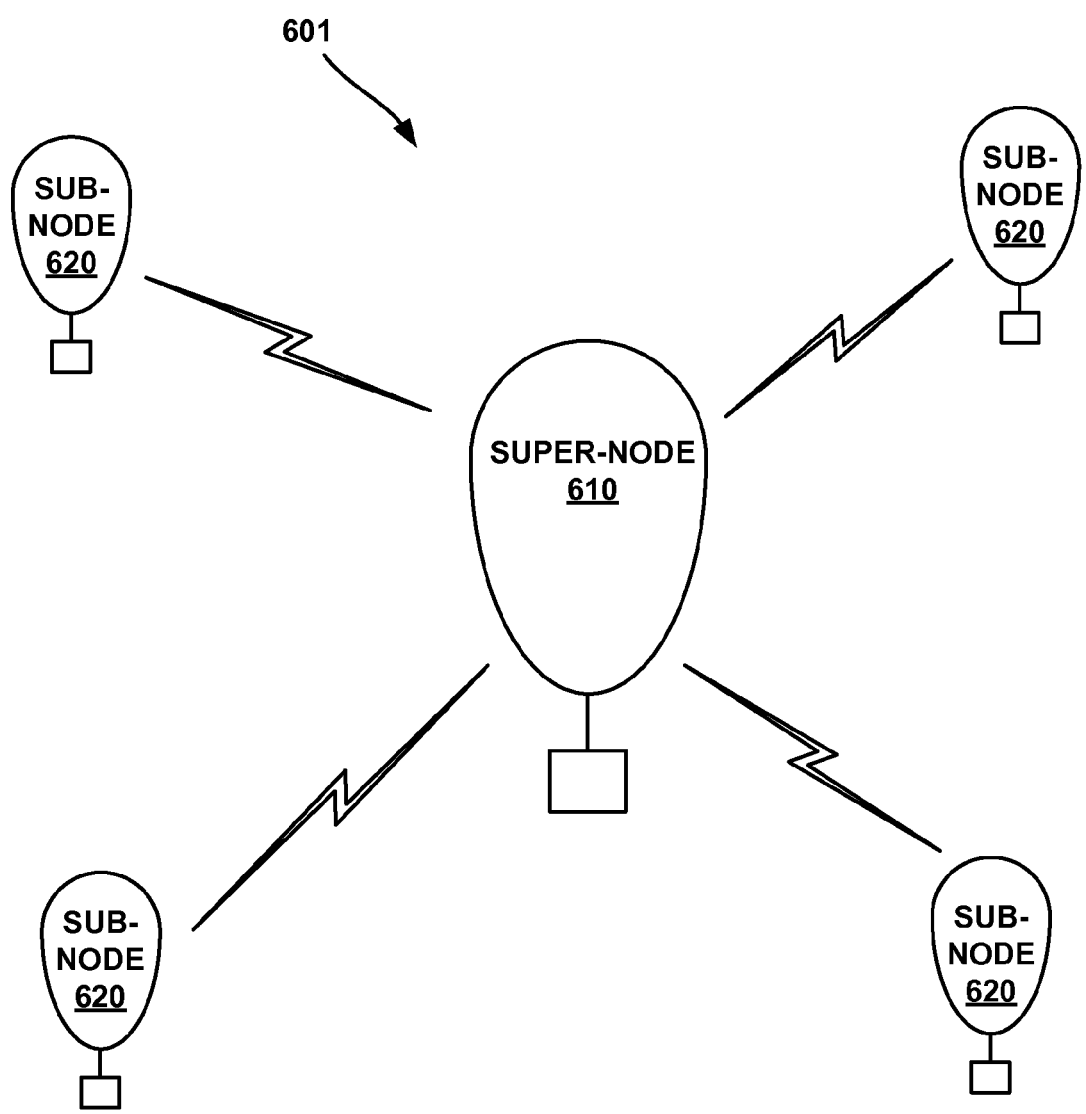
FIG. 6B is a simplified illustration of a balloon cluster, according to an exemplary embodiment.

Note that in order to simplify the illustration, the super-node and sub-node balloons in FIG. 6A are shown in balloon clusters (BCs), which each include a super-node balloon and one or more sub-node balloons. FIG. 6B is a simplified illustration of a balloon cluster, according to an exemplary embodiment. In particular, FIG. 6B shows a balloon cluster 601 that includes a super-node balloon 610 and sub-node balloons 620. The super-node balloon 610 is operable to communicate with each sub-node 620 via an RF link. Further, while not shown, super-node balloon 610 is operable to establish and communicate via one or more free-space optical links with one or more other super-node balloons.

The BCs shown in FIG. 6A may be arranged and operate in the same or a similar manner to the balloon cluster 601 shown in FIG. 6B. Further, while FIG. 6A does not show free-space optical links between the super-nodes of the BCs, it should be understood that the super-node balloons in the BCs may function as part of a mesh network by establishing free-space optical links with the super-node balloons in other BCs. For instance, in some implementations, the super-nodes within the BCs shown in FIG. 6A may serve as a backbone network, while the sub-nodes may provide access networks. More specifically, the sub-node balloons in a given BC may function as an access network, where each sub-node provides a backhaul RF link to the super-node balloon in the BC.

In an exemplary implementation, station-keeping parameters for a given geographic area may be used to form such BCs. For example, station-keeping parameters in city 602 may specify that each BC should include a super-node balloon and four sub-node balloons. Further, the station-keeping parameters in city 602 may specify spacing for BCs. Note that the formation of BCs may be accomplished via the station-keeping functionality for super-nodes and sub-nodes that effectively results in the formation of BCs, rather than by defining station-keeping parameters specifically for BCs.

For example, station-keeping parameters in city 602 may specify a certain distance range for adjacent sub-node balloons and/or a certain density of sub-node balloons, a certain distance range for adjacent super-node balloons and/or a certain density of super-node balloons. The station-keeping parameters in city 602 may also specify that each super-node should move so as to be in RF communication range of a certain number of sub-node balloons (e.g., positioned so as to provide an RF link with four sub-node balloons, or somewhere between three and five sub-node balloons). Other examples of station-keeping parameters in city 602 are also possible.

By varying station-keeping functions in a given geographic area, the topology of a balloon network may vary from area to area. For example, as shown in FIG. 6A, BCs in suburbs 604 are positioned such that super-nodes and sub-nodes are less dense in suburbs 604, as compared to in the city 602.

To accomplish a less-dense topology in the suburbs 604, station-keeping parameters for the suburbs 604 may be set such that sub-nodes and/or super-nodes in the area are less dense in the suburbs. For instance, in the suburbs 604, the upper and/or lower extent of the distance range for adjacent sub-node balloons may be greater, and/or the density of sub-node balloons may be lower, as compared to the equivalent station-keeping parameters in the city 602. Similarly, in the suburbs 604, the upper and/or lower extent of the distance range for adjacent super-node balloons may be greater, and/or the density of super-node balloons may be lower, as compared to the equivalent station-keeping parameters in the city 602. Additionally or alternatively, the upper and/or lower extent of the acceptable distance range between a super-node balloon and an adjacent sub-node balloon may be greater in the suburbs 604 as compared to the equivalent station-keeping parameters in the city 602.

In a further aspect of the network topology of region 600, BCs in rural area 606 are positioned such that super-nodes and sub-nodes are even less dense than in the suburbs 604. This may be accomplished by further varying station-keeping parameters in the manner described above.

Further, in the illustrated example, the station-keeping parameters for rural area 606 may be such that BCs over rural area 606 include more sub-nodes than the BCs over the city 602 and the suburbs 604. If the capacity of a given free-space optical link is split among a greater number of backhaul links, then the capacity of each backhaul link may be reduced. For design and/or cost reasons, this may be acceptable in various scenarios. For instance, if there is less bandwidth demand in rural 606, then decreasing the super-node to sub-node ratio may be acceptable. Other examples are possible. Further, in some scenarios, it is possible that the super-node to sub-node ratio may be reduced without affecting the bandwidth of the backhaul links.

Further, note that in region 600, the only balloons illustrated as being deployed over the ocean 608 are super-node balloons. This topology may also be achieved via station-keeping functionality. For example, station-keeping parameters may specify that sub-nodes should attempt to remain positioned over land (e.g., over city 602, suburbs 604, and rural area 606). Further, station-keeping parameters may specify the acceptable distance range and/or the acceptable density range of super-nodes over ocean 608.

Note that in practice, a network deployed over an ocean may very well have sub-node balloons as well as super-node balloons. More generally, while it is possible that a network may include only super-nodes over a certain region such as ocean 608, it is likely that most regions will also include sub-node balloons.

In some implementations, the super-node balloons 609 over ocean 608 may serve only to connect areas where sub-node balloons provide access to the balloon network. In other implementations, the super-node balloons 609 may be dually configured as super-nodes and sub-nodes. In such an implementation, the super-node balloons 609 may accordingly be configured for balloon-to-ground RF communications. Configured as such, the balloon may be accessed from ground-based stations in ocean 608 (e.g., from an access point located on a boat). In other implementations, it is also possible that sub-node balloons may also be deployed over an ocean (or another body of water), where demand for network service is typically much lower.

It should be understood that because sub-node and super-node balloons may move throughout region 600 and relative to one another over time, the particular sub-nodes in the BC served by a given super-node balloon may vary over time. As such, the sub-node balloons may function as an ad-hoc network of access networks, where sub-nodes can move between access networks.

In a further aspect, while FIGS. 6A and 6B show each sub-node as belonging to a single BC cluster, it is also possible that a given sub-node balloon could be part of access networks to multiple super-nodes (e.g., could be part of multiple BCs). In particular, a sub-node could establish RF links with two or more super-nodes.

Furthermore, while all BCs in city 602 are shown as being identical, it should be understood that the arrangement of BCs in city 602 may vary within the station-keeping framework for city 602. For example, the distance between a super-node and a sub-node may vary between the sub-nodes in a BC. As another example, the number of sub-nodes in a BC may vary in city 602. Other examples of variations are possible. Further, similar variations may exist over the suburbs 604, the rural area 606, and/or the ocean 608.

Figure 6C:
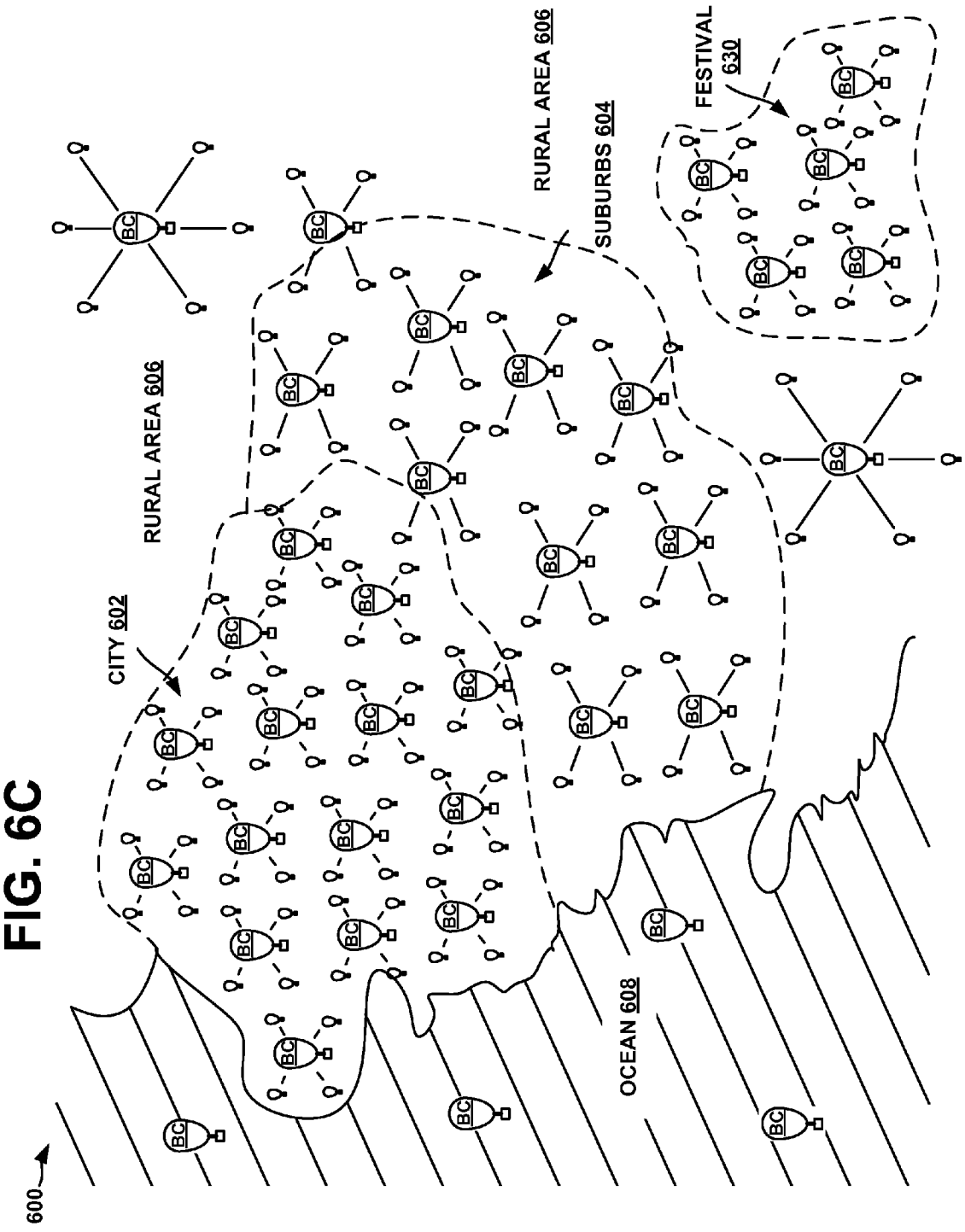
FIG. 6C shows the same balloon network spanning the same geographic areas as shown in FIG. 6A, according to an exemplary embodiment.

In yet another aspect, station-keeping parameters in areas such as city 602, suburbs 604, rural area 606, and/or ocean 608 may be updated in order to dynamically change the topology of a balloon network. For example, FIG. 6C shows the same balloon network spanning the same geographic areas as shown in FIG. 6A. However, in Figure C, the topology of the balloon network has changed from that shown in FIG. 6B, according to updated station-keeping parameters in region 600.

In particular, FIG. 6C illustrates station-keeping functionality that is adapted to a weekend where a large music and art festival is occurring in rural area 606. Since it is the weekend and many individuals are not in city 602 for work, the service demands in city 602 may be reduced. As such, station-keeping parameters for city 602 may have been updated such that the density of super-node balloons and/or sub-node balloons is reduced in city 602. Further, station-keeping parameters may have been updated to define a new geographic area for the festival grounds 630. Thus, in an effort to increase the service capacity over the festival grounds 630, the station-keeping parameters for the festival grounds may be defined so as to significantly increase the density of balloons over the festival grounds 630.

Note that on the following Monday, when the festival has ended and people are returning to work in the city, station-keeping functionality may again be adjusted. For example, station-keeping parameters may be updated such that the topology returns to a similar state as that shown in FIG. 6A. Other examples are also possible.

C. Mesh Network Functionality in a Hierarchical Balloon Network

Since balloons in an exemplary hierarchical balloon network may collectively function as a mesh network, routing may involve determining: (a) a path between a ground-based station and a source super-node balloon data via one or more sub-node balloons, (b) a path between the source super-node balloon and a target super-node balloon, which may be a single hop or may be a multi-hop path via one or more other super-node balloons, and (c) a path between the target super-node balloon and a target ground-based station via one or more sub-node balloons.

Referring back to FIG. 4, to provide a specific example of routing in a hierarchical balloon network, consider an implementation where ground-based station 430E is an access point, and ground-based station 430F is a gateway between hierarchical balloon network 400 and the Internet 460. As such, a first client device 440 may connect to the Internet 460 via ground-based station 430E and balloon network 400. Further, a second client device 450 may connect to the Internet 460, and thus may be connected to the balloon network 400 via ground-based station 430H.

In this scenario, the first client device 440 may send data to the second client device 450. When this occurs, data from client device 440 may be routed from ground-based station 430E to super-node 410C via sub-nodes 420E and 420F.

Further, routing may involve path determination through the backbone network of super-nodes to determine, e.g., a path from the source super-node to the target super-node.

Thus, when data sent from the first client device 440 to the second client device 450 is received at super-node balloon 410C, a lightpath may be determined to the target super-node balloon 410B. In the illustrated state of balloon network 400, the determined lightpath may include optical links 402 and 404.

Various mesh routing techniques may be applied in order to route data through the super-nodes to a target super-node. (The target super-node is typically a super-node balloon with an RF link to a sub-node that is serving the target ground-based station.) For example, routing through the backbone network formed by the super-node balloons may be accomplished in a similar manner as described in reference to the balloon networks illustrated in FIGS. 1 and 2. In other words, the super-nodes may be thought of as a distinct network for purposes of routing, such that paths between the super-node balloons and ground-based stations via sub-node balloons may be determined separately from paths through the super-node balloons. Further, in some implementations, a backup routing technique may be implemented such that when a light path between two super-node balloons is down, full, or otherwise unavailable, a number of sub-node balloons can act as part of the mesh network and provide a lightpath or lightpaths between the two super-node balloons.

Further, as the super-nodes locations may change relative to the ground and relative to one another, the topology of the balloon network may change over time. Accordingly, the routing technique may take into account the current network topology.

In another aspect, note that in the above example, there is only one path between ground-based station 430E and super-node 410C (i.e., the multi-hop path with RF links connecting ground-based station 430E, sub-node 420E, and sub-node 420F). As such, there is no path determination needed as there is only one path between the ground-based station and the source super-node balloon. However, it is possible that there may be multiple paths between a ground-based station and a source super-node balloon. In this case, routing may involve path determination between a ground-based station and a source super-node balloon.

For example, when the second client device 450 sends data to the first client device 440 via Internet 460, there are two paths between ground-based station 430F and super-node 410B (e.g., via sub-node 420H or sub-node 420O). As such, routing may involve path determination to select between the available paths. Alternatively, a flooding technique may be used in which data is sent via all paths between a ground-based station and a source super-node.

In a further aspect, note that similar principals apply when routing data between a target super-node balloon and a target ground based station, depending upon the topology of the one or more sub-node balloons connecting the target super-node balloon and a target ground based station.

D. Multi-layer Hierarchical Balloon Network

It should be understood that the description of a hierarchical balloon network with super-node balloons and sub-node balloons is an example of the more general concept of a hierarchical balloon network with two or more different types of balloons.

For example, an exemplary balloon network may be provided by a set of balloons that include a number of first balloons and a number of second balloons, which collectively operate as a hierarchical balloon network. In an exemplary embodiment, each of the first balloons includes a free-space optical communication system that is operable for data communications with one or more of the other first balloons. The super-node balloons described herein are examples of such first balloons. Further, each of the second balloons includes an RF communication system that is operable for data communications. The sub-node balloons described herein are examples of such second balloons.

In an exemplary embodiment, at least one first balloon further includes an RF communication system that is operable to transmit data to at least one second balloon. Further, the RF communication system of this second balloon is operable to receive the data transmitted by the at least one first balloon and to transmit the received data to at least one ground-based station.

In a further aspect, an exemplary hierarchical balloon network may further include additional types of balloons in addition to the first and second balloons. The additional balloons may communicate with the first balloons via optical links and/or RF links. Additionally or alternatively, the additional balloons may communicate with the second balloons via RF links.

IV. Conclusion

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

We claim:

1. A network system comprising:
a plurality of sub-node balloons configured as sub-nodes in a balloon network, wherein each of the sub-node balloons comprises a radio-frequency (RF) communication system that is operable for data communications; and
a plurality of super-node balloons configured as super-nodes in a balloon network, wherein each super-node balloon comprises a free-space optical communication system that is operable for data communications with one or more other super-node balloons via an optical link, and wherein at least one of the super-node balloons comprises both: (a) the free-space optical communication system that is operable for data communications with one or more other super-node balloons and (b) an RF communication system that is operable for data communications with at least one of the sub-node balloons via an RF link;
wherein the RF communication system of the at least one sub-node balloon is operable to transmit the data received from the at least one of the super-node balloons to at least one ground-based station.

2. The network system of claim 1, wherein both the super-node balloons and the sub-node balloons are high-altitude balloons.

3. The network system of claim 1, wherein at least the super-node balloons are collectively operable as a mesh network.

4. The network system of claim 3, wherein the mesh network comprises optical links between super-node balloons.

5. The network system of claim 1, wherein the super-node balloons and the sub-node balloons are collectively operable as a mesh network, and wherein the mesh network comprises optical links between super-node balloons and RF links between super-node balloons and sub-node balloons.

6. The network system of claim 1, wherein the free-space optical communication system of one or more of the super-node balloons comprises one or more ultra-bright light-emitting diodes that are operable to transmit a free-space optical signal.

7. The network system of claim 1, wherein the free-space optical communication system of one or more of the super-node balloons comprises a receiver that is operable to receive a free-space optical signal.

8. The network system of claim 1, wherein the free-space optical communication system of one or more of the super-node balloons comprises a laser system that is operable to transmit a free-space optical signal.

9. The network system of claim 1, further comprising at least one downlink balloon, wherein the at least one downlink balloon comprises a free-space optical communication system that is operable to: (a) communicate with one or more of the super-node balloons and (b) communicate with at least one ground-based station.

10. The network system of claim 1, wherein one or more of the super-node balloons and one or more of the sub-node balloons each comprise an altitude-control system that is operable to adjust altitude.

11. The network system of claim 10, wherein the altitude-control system in each of the one or more super-node balloons and the one or more of the sub-node balloons is operable to change the altitude of the respective balloon via adjustments to at least one of: (a) gas density of the respective balloon and (b) gas volume of the respective balloon.

12. The network system of claim 10, wherein each of the one or more of the super-node balloons and the one or more of the sub-node balloons is further operable to:
use altitudinal wind data to determine a target altitude having wind that corresponds to a desired lateral movement of the respective balloon; and
cause the altitude-control system to initiate altitudinal movement of the respective balloon towards the target altitude in an effort to cause the desired horizontal movement of the respective balloon.

13. The network system of claim 1, wherein the super-node balloons and the sub-node balloons are collectively operable as a mesh network, and wherein each balloon is further operable to determine the desired horizontal movement of the respective balloon based on a desired topology of the mesh network.

14. The network system of claim 1, wherein the super-node balloons and the sub-node balloons are in substantially continuous motion, and wherein the super-node balloons and the sub-node balloons use altitudinal adjustments to move so as to conform with station-keeping parameters.

15. The network system of claim 1, the super-node balloons and the sub-node balloons move based on one or more station-keeping parameters, wherein the station-keeping parameters are based on a desired network topology.

16. The network system of claim 15, wherein the one or more station-keeping parameters comprise an acceptable distance range between any two of the super-node balloons and the sub-node balloons.

17. The network system of claim 15, wherein the one or more station-keeping parameters comprise one or more of: (a) an acceptable distance range between adjacent super-node balloons, (b) an acceptable distance range between adjacent sub-node balloons, and (c) an acceptable distance range between a super-node balloon and an adjacent sub-node balloon.

18. The network system of claim 15, wherein the one or more station-keeping parameters comprise an acceptable amount of deviation from a desired density of the super-node balloons and the sub-node balloons.

19. The network system of claim 15, wherein the one or more station-keeping parameters comprise one or more of: (a) an acceptable amount of deviation from a desired density of super-node balloons and (b) an acceptable amount of deviation from a desired density of sub-node balloons, and (c) an acceptable distance range between a super-node balloon and an adjacent sub-node balloon.

20. The network system of claim 15, wherein the station-keeping parameters comprise a first set of station-keeping parameters for the super-node balloons and a second set of station-keeping parameters for the sub-node balloons.

21. The network system of claim 15, wherein the balloon network provides coverage in a plurality of defined geographic areas, and wherein station-keeping parameters are separately determined for each defined geographic area.

22. The network system of claim 1, wherein the super-node balloons collectively provide a backbone of the balloon network, and wherein the sub-node balloons provide one or more access networks for the balloon network.

23. The network system of claim 1, wherein station-keeping functionality of the super-node balloons and the sub-node balloons is supported, at least in part, by a centralized control system, wherein the centralized control system comprises one or more ground-based systems.

24. The network system of claim 23, wherein the centralized control system comprises a central control system and one or more regional control systems.

25. The network system of claim 1, wherein station-keeping functionality of each of the super-node balloons and the sub-node balloons is carried out, at least in part, by the respective balloon.

26. A network system comprising:
a plurality of balloons that collectively operate as a hierarchical balloon network, wherein the plurality of balloons comprise at least a plurality of first balloons and a plurality of second balloons;
wherein each of the second balloons comprises a radio-frequency (RF) communication system that is operable for data communications;
wherein each of the first balloons comprises a free-space optical communication system that is operable for packet-data communication with one or more other first balloons, and wherein at least one of the first balloons comprises both: (a) the free-space optical communication system that is operable for packet-data communication with one or more other first balloons and (b) an RF communication system that is operable to transmit data to at least one second balloon; and
wherein the RF communication system of the at least one second balloon is operable to receive the data transmitted by the at least one first balloon and to transmit the received data to at least one ground-based station.

27. The network system of claim 26, wherein the plurality of balloons that collectively operate as the hierarchical balloon network further comprise one or more other types of balloons, in addition to the first and second balloons.

28. The network system of claim 26, wherein the plurality of balloons that collectively operate as the hierarchical balloon network are high-altitude balloons.

29. The network system of claim 26, wherein at least the first balloons are collectively operable as a mesh network.

30. The network system of claim 29, wherein the mesh network comprises optical links between super-node balloons.

31. The network system of claim 26, wherein the hierarchical balloon network is a hierarchical mesh network, and wherein the hierarchical mesh network comprises optical links between the first balloons and RF links between the first balloons and the second balloons.

32. The network system of claim 26, wherein one or more of the first balloons and one or more of the second balloons each comprise an altitude-control system that is operable to adjust altitude.

33. The network system of claim 32, wherein each of the one or more first balloons and the one or more second balloons that comprises an altitude-control system is further operable to:
   use altitudinal wind data to determine a target altitude having wind that corresponds to a desired lateral movement of the respective balloon; and
   cause the altitude-control system to initiate altitudinal movement of the respective balloon towards the target altitude in an effort to cause the desired horizontal movement of the respective balloon.

\* \* \* \* \*